United States Patent
Barendse et al.

(10) Patent No.: US 9,661,864 B2
(45) Date of Patent: *May 30, 2017

(54) PROCESS FOR THE PREPARATION OF A SPREADABLE DISPERSION

(71) Applicant: Conopco, Inc., Englewood Cliffs, NJ (US)

(72) Inventors: Sandra Petronella Barendse, Vlaardingen (NL); Eckhard Floter, Vlaardingen (NL); Wim Theodorus Hogervorst, Vlaardingen (NL); Dirk Simon Hendriks Van Horsen, Vlaardingen (NL); Hindrik Huizinga, Vlaardingen (NL); Gijsbert Michiel Peter van Kempen, Vlaardingen (NL)

(73) Assignee: Unilever BCS US, Inc., Englewood Cliffs, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,706

(22) Filed: Dec. 29, 2014

(65) Prior Publication Data

US 2015/0118384 A1 Apr. 30, 2015

Related U.S. Application Data

(63) Continuation of application No. 13/435,943, filed on Mar. 30, 2012, now Pat. No. 8,927,045, which is a continuation of application No. 11/884,282, filed as application No. PCT/EP2006/000800 on Jan. 25, 2006, now Pat. No. 8,147,895.

(30) Foreign Application Priority Data

| Feb. 17, 2005 | (EP) | ................................... 05075384 |
| Feb. 17, 2005 | (EP) | ................................... 05075391 |
| Feb. 17, 2005 | (EP) | ................................... 05075392 |
| Feb. 17, 2005 | (EP) | ................................... 05075393 |

(51) Int. Cl.
| A23D 7/00 | (2006.01) |
| A23D 7/005 | (2006.01) |
| A23D 9/007 | (2006.01) |
| A23D 9/05 | (2006.01) |
| A23L 23/10 | (2016.01) |

(52) U.S. Cl.
CPC ........... *A23D 7/001* (2013.01); *A23D 7/0056* (2013.01); *A23D 9/007* (2013.01); *A23D 9/05* (2013.01); *A23L 23/10* (2016.08); *A23V 2002/00* (2013.01)

(58) Field of Classification Search
None
See application file for complete search history.

(56) References Cited

U.S. PATENT DOCUMENTS

| 2,521,219 A | 9/1950 | Holman et al. |
| 2,521,242 A | 9/1950 | Mitchell, Jr. |
| 2,615,160 A | 10/1952 | Baur |
| 2,815,286 A | 12/1957 | Andre et al. |
| 3,120,438 A | 2/1964 | McIntire et al. |
| 3,170,799 A | 2/1965 | Feuge |
| 3,270,040 A | 8/1966 | Bradshaw |
| 3,295,986 A | 1/1967 | Saslaw et al. |
| 3,338,720 A | 8/1967 | Pichel |
| 3,425,843 A | 2/1969 | Japikse |
| 3,433,650 A | 3/1969 | Block et al. |
| 3,528,823 A | 9/1970 | Rossen |
| 3,634,100 A | 1/1972 | Fondu et al. |
| 3,881,005 A | 4/1975 | Thakkar et al. |
| 3,892,880 A | 7/1975 | Grolitsch |
| 4,021,582 A | 5/1977 | Hsu |
| 4,160,850 A | 7/1979 | Hallstrom et al. |
| 4,226,894 A | 10/1980 | Gawrilow |
| 4,232,052 A | 11/1980 | Nappen |
| 4,234,577 A | 11/1980 | Zilliken |
| 4,234,606 A | 11/1980 | Gawrilow |
| 4,288,460 A | 9/1981 | Ciliberto et al. |
| 4,292,338 A | 9/1981 | Ainger et al. |
| 4,294,862 A | 10/1981 | Wilke |
| 4,308,288 A | 12/1981 | Hara et al. |
| 4,341,813 A | 7/1982 | Ward |
| 4,366,181 A | 12/1982 | Dijkshoorn et al. |
| 4,375,483 A | 3/1983 | Shuford et al. |
| 4,385,076 A | 5/1983 | Crosby |
| 4,388,339 A | 6/1983 | Lomneth et al. |

(Continued)

FOREIGN PATENT DOCUMENTS

| AR | DE10253193 | 6/2004 |
| AU | 2004262853 | 6/2008 |

(Continued)

OTHER PUBLICATIONS

Nutrition: Today's challenges and opportunities, Leatherhead Food International, Jun. 2008, pp. 1-6, vol. 42 No. 5, US.
The prilling process with liquid nitrogen, Jet Priller, Jun. 23, 2010, pp. 1-2, ., Linde, US.
Anna Von Bonsdorff-Nikander, Studies on a Cholesterol-Lowering Microcrystalline Phystosterol Suspension in Oil, Division of Pharmaceutical Technology Faculty of Pharmacy, Feb. 12, 2005, 12, 28-30, 35-44.
Anonymous, Particle Sizes of Milk Powders Part I, Dairy Products Technolgoy Center Dairy Ingredients Applications Program, Apr. 2000, pp. 1-2, vol. 2 No. 4.

(Continued)

*Primary Examiner* — Nikki H Dees
*Assistant Examiner* — Amber Cox
(74) *Attorney, Agent, or Firm* — Gerard J. McGowan, Jr.

(57) ABSTRACT

Process for the preparation of a spreadable edible dispersion wherein a mixture of oil and solid structuring agent particles is subjected to stirring and an aqueous phase and/or solid phase is gradually added to the mixture until a dispersion of the desired oil content is obtained, wherein the solid structuring agent particles have a microporous structure of submicron size particles.

20 Claims, 1 Drawing Sheet

(56) References Cited

U.S. PATENT DOCUMENTS

| | | | |
|---|---|---|---|
| 4,390,561 A | 6/1983 | Blair et al. |
| 4,391,838 A | 7/1983 | Pate |
| 4,469,710 A | 9/1984 | Rielley et al. |
| 4,486,457 A | 12/1984 | Schijf et al. |
| 4,501,764 A | 2/1985 | Gercama et al. |
| 4,578,274 A | 3/1986 | Sugisawa et al. |
| 4,591,507 A | 5/1986 | Bodor et al. |
| 4,826,699 A | 5/1989 | Soe |
| 4,855,157 A | 8/1989 | Tashiro et al. |
| 4,889,740 A | 12/1989 | Price |
| 4,917,915 A | 4/1990 | Cain et al. |
| 4,933,192 A | 6/1990 | Darling et al. |
| 4,990,355 A | 2/1991 | Gupta et al. |
| 5,127,953 A | 7/1992 | Hamaguchi |
| 5,130,156 A | 7/1992 | Bergquist et al. |
| 5,185,173 A | 2/1993 | Bethke et al. |
| 5,186,866 A | 2/1993 | Ryuo et al. |
| 5,302,408 A | 4/1994 | Cain et al. |
| 5,352,475 A | 10/1994 | Tholl |
| 5,391,382 A | 2/1995 | Chappell |
| 5,429,836 A | 7/1995 | Fuisz |
| 5,447,735 A | 9/1995 | Miller |
| 5,451,421 A | 9/1995 | Tanihara et al. |
| 5,516,543 A | 5/1996 | Amankonah et al. |
| 5,620,734 A | 4/1997 | Wesdorp et al. |
| 5,707,670 A | 1/1998 | Mehansho et al. |
| 5,858,445 A | 1/1999 | Huizinga et al. |
| 5,866,192 A | 2/1999 | Uesugi et al. |
| 5,904,949 A | 5/1999 | Reddy et al. |
| 5,916,608 A | 6/1999 | Lanting et al. |
| 5,916,808 A | 6/1999 | Kole et al. |
| 5,972,412 A | 10/1999 | Sassen et al. |
| 5,985,350 A | 11/1999 | Gubler et al. |
| 6,020,003 A | 2/2000 | Stroh et al. |
| 6,031,118 A | 2/2000 | van Amerongen et al. |
| 6,056,791 A | 5/2000 | Weidner et al. |
| 6,077,558 A | 6/2000 | Euber |
| 6,106,885 A | 8/2000 | Huizinga et al. |
| 6,106,886 A | 8/2000 | van Amerongen et al. |
| 6,117,475 A | 9/2000 | van Amerongen et al. |
| 6,117,478 A | 9/2000 | Dubberke |
| 6,129,944 A | 10/2000 | Tiainen et al. |
| 6,156,370 A | 12/2000 | Huizinga et al. |
| 6,159,525 A | 12/2000 | Lievense et al. |
| 6,171,636 B1 | 1/2001 | Sassen et al. |
| 6,190,680 B1 | 2/2001 | Sakurada et al. |
| 6,214,406 B1 | 4/2001 | Reimerdes |
| 6,217,920 B1 | 4/2001 | van Eendenburg et al. |
| 6,238,723 B1 | 5/2001 | Sassen et al. |
| 6,248,389 B1 | 6/2001 | Biller et al. |
| 6,284,302 B1 | 9/2001 | Berger et al. |
| 6,312,752 B1 | 11/2001 | Lansbergen et al. |
| 6,316,030 B1 | 11/2001 | Kropf et al. |
| 6,322,842 B1 | 11/2001 | Reddy et al. |
| 6,352,737 B1 | 3/2002 | Dolhaine et al. |
| 6,395,324 B1 | 5/2002 | Effey et al. |
| 6,403,144 B1 | 6/2002 | El-Khoury et al. |
| 6,423,326 B1 | 7/2002 | Shapiro |
| 6,423,363 B1 | 7/2002 | Traska et al. |
| 6,440,336 B1 | 8/2002 | Weinreich et al. |
| 6,468,578 B1 | 10/2002 | Bodor et al. |
| 6,531,173 B2 | 3/2003 | Brooker |
| 6,533,252 B1 | 3/2003 | Bernard et al. |
| 6,582,749 B2 | 6/2003 | Merrick et al. |
| 6,616,849 B1 | 9/2003 | Osajima et al. |
| 6,743,450 B2 | 6/2004 | Romanczyk, Jr. et al. |
| 6,753,032 B1 | 6/2004 | Hirokawa et al. |
| 6,800,317 B2 | 10/2004 | Wester et al. |
| 6,808,737 B2 | 10/2004 | Ullanoormadam |
| 6,827,964 B2 | 12/2004 | Wester et al. |
| 6,929,816 B2 | 8/2005 | Wester |
| 6,986,846 B2 | 1/2006 | Shekunov et al. |
| 7,056,949 B2 | 6/2006 | Koike et al. |
| 7,118,773 B2 | 10/2006 | Floeter et al. |
| 7,223,435 B2 | 5/2007 | Besselink et al. |
| 7,575,768 B2 | 8/2009 | Perlman et al. |
| 7,601,184 B2 | 10/2009 | Tischendorf |
| 7,618,670 B2 | 11/2009 | Ullanoormadam |
| 7,807,208 B2 | 10/2010 | Ullanoormadam |
| 7,862,751 B2 | 1/2011 | Foster et al. |
| 8,025,913 B2 | 9/2011 | van den Berg et al. |
| 8,124,152 B2 | 2/2012 | Janssen et al. |
| 8,147,895 B2 * | 4/2012 | Barendse ............ A23D 7/0056 426/285 |
| 8,211,470 B2 | 7/2012 | Kim |
| 8,431,370 B2 | 4/2013 | ten Brink et al. |
| 8,586,122 B2 | 11/2013 | McNeill et al. |
| 8,927,045 B2 * | 1/2015 | Barendse ............ A23D 7/0056 426/285 |
| 8,940,355 B2 | 1/2015 | van den Berg et al. |
| 2001/0029047 A1 | 10/2001 | Liu et al. |
| 2002/0034577 A1 | 3/2002 | Vogensen et al. |
| 2002/0048606 A1 | 4/2002 | Zawistowski |
| 2002/0076476 A1 | 6/2002 | Kuil et al. |
| 2002/0132035 A1 | 9/2002 | Tamarkin et al. |
| 2002/0168450 A1 | 11/2002 | Drudis et al. |
| 2003/0064141 A1 | 4/2003 | Brooker |
| 2003/0068425 A1 | 4/2003 | Khare |
| 2003/0124228 A1 | 7/2003 | Goto et al. |
| 2003/0165572 A1 | 9/2003 | Auriou |
| 2003/0203854 A1 | 10/2003 | Pischel et al. |
| 2004/0076732 A1 | 4/2004 | Valix |
| 2004/0101601 A1 | 5/2004 | Loh et al. |
| 2004/0105931 A1 | 6/2004 | Basheer et al. |
| 2004/0126475 A1 | 7/2004 | Hashizume et al. |
| 2004/0166204 A1 | 8/2004 | Smith et al. |
| 2004/0197446 A1 | 10/2004 | Haynes et al. |
| 2005/0014158 A1 | 1/2005 | Adam et al. |
| 2005/0069619 A1 | 3/2005 | Bot et al. |
| 2005/0069625 A1 | 3/2005 | Chimel et al. |
| 2005/0123667 A1 | 6/2005 | Sakuma et al. |
| 2005/0170062 A1 | 8/2005 | Burling et al. |
| 2005/0175745 A1 | 8/2005 | Zawistowski |
| 2005/0196512 A1 | 9/2005 | Nakhasi et al. |
| 2005/0271791 A1 | 12/2005 | Wright et al. |
| 2006/0019021 A1 | 1/2006 | Plank et al. |
| 2006/0035871 A1 | 2/2006 | Auweter et al. |
| 2006/0051479 A1 | 3/2006 | Chiavazza et al. |
| 2006/0115553 A1 | 6/2006 | Gautam et al. |
| 2006/0280855 A1 | 12/2006 | Van Den Berg et al. |
| 2007/0054028 A1 | 3/2007 | Perlman et al. |
| 2007/0154617 A1 | 7/2007 | Lansbergen |
| 2007/0254088 A1 | 11/2007 | Stewart et al. |
| 2007/0286940 A1 | 12/2007 | Herzing et al. |
| 2008/0089978 A1 | 4/2008 | Grigg et al. |
| 2008/0187645 A1 | 8/2008 | Ekblom et al. |
| 2008/0193628 A1 | 8/2008 | Garbolino et al. |
| 2008/0193638 A1 | 8/2008 | McMaster et al. |
| 2008/0226786 A1 | 9/2008 | Ward et al. |
| 2008/0268130 A1 | 10/2008 | Bons et al. |
| 2008/0274175 A1 | 11/2008 | Schramm et al. |
| 2008/0317917 A1 | 12/2008 | Janssen et al. |
| 2009/0022868 A1 | 1/2009 | Van Den Bremt et al. |
| 2009/0029024 A1 | 1/2009 | McNeill et al. |
| 2009/0041898 A1 | 2/2009 | Garbolino et al. |
| 2009/0123633 A1 | 5/2009 | Cleenewerck et al. |
| 2009/0136645 A1 | 5/2009 | Garbolino |
| 2009/0263559 A1 | 10/2009 | Van Horsen et al. |
| 2010/0040737 A1 | 2/2010 | Radlo et al. |
| 2010/0159079 A1 | 6/2010 | Qvyjt |
| 2011/0070335 A1 | 3/2011 | Brugger et al. |
| 2011/0244111 A1 | 10/2011 | Den Adel et al. |
| 2011/0287156 A1 | 11/2011 | Perlman |
| 2011/0287160 A1 | 11/2011 | Dobenesque et al. |
| 2011/0311706 A1 | 12/2011 | van den Berg et al. |
| 2011/0311707 A1 | 12/2011 | Bezemer et al. |
| 2012/0018535 A1 | 1/2012 | Wubbolts et al. |
| 2013/0004522 A1 | 1/2013 | Dvir et al. |
| 2013/0115361 A1 | 5/2013 | Floter et al. |

FOREIGN PATENT DOCUMENTS

| | | |
|---|---|---|
| DE | 2253515 | 5/1974 |
| DE | 3220916 | 12/1983 |

(56) References Cited

FOREIGN PATENT DOCUMENTS

| | | |
|---|---|---|
| DE | 10253111 | 5/2004 |
| EA | EP0505007 | 9/1992 |
| EA | EP0327225 | 7/1993 |
| EP | 0021483 | 1/1981 |
| EP | 0041299 | 1/1983 |
| EP | 0089082 | 9/1983 |
| EP | 0063835 | 4/1985 |
| EP | 0237120 | 9/1987 |
| EP | 0294692 | 12/1988 |
| EP | 0327120 | 8/1989 |
| EP | 0393963 | 10/1990 |
| EP | 0289069 | 3/1993 |
| EP | 0572051 | 12/1993 |
| EP | 0775444 | 5/1997 |
| EP | 0780058 | 6/1997 |
| EP | 0796567 | 9/1997 |
| EP | 0744992 | 10/1997 |
| EP | 0898896 | 3/1999 |
| EP | 0594152 | 2/2000 |
| EP | 1238589 | 9/2002 |
| EP | 0962150 | 8/2003 |
| EP | 1419698 | 5/2004 |
| EP | 1419811 | 5/2004 |
| EP | 1557090 | 7/2005 |
| EP | 1795257 | 6/2007 |
| EP | 1815752 | 8/2007 |
| EP | 1180545 | 9/2007 |
| EP | 1114674 | 9/2008 |
| EP | 2016834 | 1/2009 |
| EP | 1285584 | 11/2009 |
| EP | 2123164 | 11/2009 |
| EP | 2181604 | 5/2010 |
| EP | 1197153 | 3/2011 |
| EP | 1651338 | 5/2011 |
| EP | 0897671 | 7/2011 |
| EP | 1865786 | 11/2011 |
| FR | 2243653 | 4/1975 |
| FR | 2776167 | 9/1999 |
| GB | 1114674 | 5/1968 |
| GB | 1537011 | 12/1978 |
| GB | 1538958 | 1/1979 |
| GB | 2095968 | 10/1982 |
| GB | 2177283 | 1/1987 |
| GB | 2208296 | 3/1989 |
| GB | 2208378 | 11/1991 |
| GB | 2292949 | 3/1996 |
| GB | 2320175 | 6/1998 |
| JP | 5951742 | 3/1984 |
| JP | 62239949 | 10/1987 |
| JP | 2299544 | 12/1990 |
| JP | 2003210107 | 7/2003 |
| WO | WO9308699 | 5/1993 |
| WO | WO9521688 | 8/1995 |
| WO | WO9638047 | 12/1995 |
| WO | WO9614755 | 5/1996 |
| WO | WO9619115 | 6/1996 |
| WO | WO9742830 | 11/1997 |
| WO | WO9813133 | 4/1998 |
| WO | WO9847386 | 10/1998 |
| WO | WO9956558 | 11/1999 |
| WO | WO0009636 | 2/2000 |
| WO | WO0021490 | 4/2000 |
| WO | WO0045648 | 8/2000 |
| WO | WO0041491 | 12/2000 |
| WO | WO0100046 | 1/2001 |
| WO | WO0132035 | 5/2001 |
| WO | WO0143559 | 6/2001 |
| WO | WO0166560 | 9/2001 |
| WO | WO0178529 | 10/2001 |
| WO | WO0191569 | 12/2001 |
| WO | WO02100183 | 12/2002 |
| WO | WO03043430 | 5/2003 |
| WO | WO03084337 | 10/2003 |
| WO | WO03096817 | 11/2003 |
| WO | WO03103633 | 12/2003 |
| WO | WO2004068959 | 8/2004 |
| WO | WO2004093571 | 11/2004 |
| WO | WO2005014158 | 2/2005 |
| WO | WO2005051089 | 6/2005 |
| WO | WO2005071053 | 8/2005 |
| WO | WO2005074717 | 8/2005 |
| WO | WO2005074726 | 8/2005 |
| WO | WO2006005141 | 2/2006 |
| WO | WO2006066979 | 6/2006 |
| WO | WO2006079445 | 8/2006 |
| WO | WO2006087090 | 8/2006 |
| WO | WO2006087091 | 8/2006 |
| WO | WO2006087092 | 8/2006 |
| WO | WO2006087093 | 8/2006 |
| WO | WO2006134152 | 12/2006 |
| WO | WO2007022897 | 3/2007 |
| WO | WO2007024770 | 4/2007 |
| WO | WO2007039020 | 4/2007 |
| WO | WO2007039040 | 4/2007 |
| WO | WO2007096211 | 8/2007 |
| WO | WO2007096243 | 8/2007 |
| WO | WO2008125380 | 10/2008 |
| WO | WO2009068651 | 6/2009 |
| WO | WO2010053360 | 5/2010 |
| WO | WO2010060713 | 6/2010 |
| WO | WO2010069746 | 6/2010 |
| WO | WO2010069747 | 6/2010 |
| WO | WO2010069750 | 6/2010 |
| WO | WO2010069751 | 6/2010 |
| WO | WO2010069752 | 6/2010 |
| WO | WO2010069753 | 6/2010 |
| WO | WO2011160921 | 12/2011 |

OTHER PUBLICATIONS

Belitz et al., Milk and Dairy Products, Food Chemistry, 1999, pp. 470-474 and pp. 497-498XP002264854.

Charteris et al., Edible table (bio) spread containing potentially probiotic *Lactobacillus* and *Bifidobacterium* species, International Journal of Dairy Technology, Feb. 2002, pp. 44-56XP002635276, vol. 55 No. 1.

Christiansen et al, Cholesterol-lowering effect of spreads enriched with microcrystalline plant sterols in hypercholesterolemic subject, European Journal of Nutrition, 2001, 66-73, 40.

Christoph et al., Glycerol, Ullmann's Encyclopedia of Industrial Chemistry, 2012, pp. 67-82. NB: only relevant pp. 67-69 and 79., vol. 17, Wiley-VCH Verlag GmbH & Co. KGaA, Weinheim.

D. Chapman, The Polymorphism of Glycerides, University Chemical Laboratory Chemical Reviews, Dec. 2, 1961, pp. 433-456, 62.

De Graaf et al., Consumption of tall oil-derived phytosterols in a chocolate matrix significantly decreases plasma total and low-density lipoprotein-cholesterol levels, British Journal of Nutrition, 2002, pp. 479-488.

Experimental and Analytical Facilities, Delft University of Technology, Dec. 16, 2005, pp. 41-51.

Ferguson et al., The Polymorphic Forms or Phases of Triglyceride Fats, Chemical Reviews, 1941, pp. 355-384.

Fischer, Formulation challenges in Ice Cream Gelling and thickening systems and their applications fruit preparations, Food Ingredients and Analysis International, 2001, pp. 29-31, vol. 23 No. 3.

Fischer, Improved fruit fibres for modern food processing, Food Ingredients and Analysis International, 2001, pp. 29-31, vol. 23 No. 3.

Formo et al., Bailey's Industrial Oil and Fat Products, Bailey's Industiral Oil and Fat Products, 1979, pp. 317, 326, 377, 382, 398, vol. 1 4th Edition.

Formo et al., Composition and Characteristics of Individual Fats and Oils, Bailey's Industrial Oil and Fat Products, 1979, pp. 382-384, vol. 1 4th Edition.

Garti et al., Stabilization of Water-in-Oil Emulsions by Submicrocrystalline α-Form Fat Particles, JAOCS Journal of the American Oil Chemists' Society, 1998, pp. 1825-1831XP002164689, vol. 75 No. 12.

Gerber et al., Effect of Process-Parameters on Particles Obtained by the Rapid Expansion of Supercritical Solutions, World Congress on Oil Particle Technology, 1998, pp. 1-11XP001080632.

(56) References Cited

OTHER PUBLICATIONS

Gunstone et al., Analytical Methods Slip Point, The Lipid Handbook, 1994, pp. 321-322, 2nd Edition.
Gunstone et al., Food uses of oils and fats, The Lipid Handbook, 2007, pp. 336-341, 3rd Edition.
Gunstone et al., Occurrence and characterisation of oils and fats, The Lipid Handbook, 2007, pp. 49-53, 3rd Edition.
Gunstone et al., Occurrence and Characterisation of Oils and Fats, The Lipid Handbook, 2007, pp. 51, 55, 63, 66, 67, 3rd Edition.
Gunstone et al., Polymorphism and nomenclature of lipid crystal forms, The Lipid Handbook, 1995, pp. 405, 2nd Edition.
Gunstone, Lipids in Foods, Lipids in Foods Chemistry, Biochemistry and Technology, 1983, pp. 154.
Hasenhuettl et al., Starch, Food Emulsifiers and Their Applications, 2007, pp. 274-275, Second Edition.
Hayes et al, Nonesterified Phytosterols Dissolved and Recrystallized in Oil Reduce Plasma Cholesterol in Gerbils and Humans, The journal of Nutrition, Jun. 1, 2006, 1395-1399, 134 No. 6, US.
Hui, Bailey's Industrial Oil and Fat Products, Bailey's Industrial Oil and Fat Products, 1996, pp. 484-485, 1-5th edition, US.
Hydrogenation, Wikipedia, pp. 1-10.
Interesterified Fat, Wikipedia, pp. 1-4.
IPRP 1 in PCTEP2011071150, Feb. 25, 2013.
IPRP in PCTEP2009066104, Sep. 28, 2010, WO.
IPRP in PCTEP2009066105, Mar. 24, 2011.
IPRP in PCTEP2011071150, Apr. 23, 2013.
IPRP1 in PCTEP2009066093, Jun. 21, 2011.
IPRP1 in PCTEP2009066098, Jun. 21, 2011.
IPRP1 in PCTEP2009066107, Jun. 21, 2011.
IPRP1 in PCTEP2011070933, Jun. 18, 2013.
IPRP2 in PCTEP2004006544, Jan. 3, 2006, WO.
IPRP2 in PCTEP2006000800, Jun. 27, 2007, WO.
IPRP2 in PCTEP2006000801, Mar. 20, 2007.
IPRP2 in PCTEP2009066095, Mar. 24, 2011, WO.
IPRP2 in PCTEP2009066105, Mar. 24, 2011.
IPRP2 in PCTEP2011065601, Sep. 24, 2012, WO.
IPRP2 in PCTEP2011070948, Mar. 11, 2013, WO.
IPRP2 in PCTEP2011071168, Sep. 5, 2012.
IPRP2 in PCTEP2011071397, Mar. 21, 2013.
IRPR2 in PCTEP2011058922, Jul. 6, 2012.
Johansson et al., Water-in-Triglyceride Oil Emulsions. Effect of Fat Crystals on Stability, JAOCS Journal of the American Oil Chemists' Society, 1995, pp. 939-950, vol. 72 No. 8.
K. Davidsson, Powdered fats for soups and sauces—and a range of other food products, Food Ingredients and Analysis International, 2001, pp. 29-30, 23 (4).
Lipson et al., Analysis of the Broadening of Powder Lines, Interpretation of X-Ray Powder Diffraction Patterns, 1970, pp. 244-263.
Lopez et al., Milk fat and primary fractions obtained by dry fractionation 1. Chemical composition and crystallisation properties, Chemistry and Physics of Lipids, Oct. 2006, pp. 17-33, vol. 144, Issue 1.
Lowe, Experimental Cookery, Experimental Cookery, 1955, pp. 270-273, 4th edition, ., US.
M. Dervisoglu and F. Yazici, The Effect of Citrus Fibre on the Physical, Chemical and Sensory Properties of Ice Cream, Food Science and Technology International, Apr. 2006, pp. 159-164—with abstract, 12.
Margarines and Shortenings, Ullmanns Encyclopedia of Industrial Chemistry, 1990, pp. 156-158, vol. A16.
Micaleff et al, Beyond blood lipids phytosterols statins and omega-3 polyunsaturated fatty acid therapy for hyperlipidemia, Journal of Nutrional Biochemistry, 2009, pp. 927-939; XP026755870, vol. 20.
Munuklu et al., Particle formation of an edible fat (rapeseed 70) using the supercritical melt micronization (ScMM) process, The Journal of Supercritical Fluids, Apr. 2007, pp. 433-442, vol. 40, Issue 3.
Munuklu et al., Supercritical Melt Micronization Using theParticles from Gas Saturated Solution Process, American Chemical Society Symposium, 2003, pp. 353-369.
Nathalie De Cock, Structure development in confectionery products: importance of triacylglycerol composition, Universiteit Gent Faculteit Bio-ingenieurswetenschappen, 2011, pp. 1-72.
Norizzah et al., Effects of chemical interesterification on physicochemical properties of palm stearin and palm kernel olein blends, Food Chemistry, 2004, pp. 229-235, 86.
Notice of Opposition from Feyecon Development & Implementation BV in EP06706499, Aug. 30, 2012.
Notice of Opposition from Kerry Group Services Intl Ltd in EP06706499, Aug. 30, 2012.
P. Munuklu, Particle formation of edible fats using the supercritical melt micronization process (ScMM), The Journal of Supercritical Fluids, 2007, pp. 181-190, 43.
Pernetti et al., Structuring of edible oils by alternatives to crystalline fat, Current Opinion in Colloid & Interface Science, Oct. 2007, pp. 221-231, vol. 12, Issues 4-5.
Ribeiro et al., Zero trans fats from soybean oil and fully hydrogenated soybean oil: Physico-chemical properties and food applications, Food Research International, 2009, pp. 401-410, vol. 42.
S. P. Kochhar, Influence of Processing on Sterols of Edible Vegetable Oils, Prog Lipid Res, 1983, pp. 161-188, vol. 22.
Search Report in EP03077247, Apr. 7, 2004.
Search Report in EP05075384, Jul. 5, 2005, EP.
Search Report in EP05075393, Jul. 20, 2005.
Search report in EP06122483, Jul. 15, 2008, EP.
Search Report in EP08172283, Jun. 5, 2009.
Search Report in EP08172284, Jun. 4, 2009, EP.
Search Report in EP08172286, May 20, 2009, EP.
Search Report in EP08172298, Apr. 9, 2009, EP.
Search Report in EP08172300, Jun. 5, 2009.
Search Report in EP08172304, May 28, 2009.
Search Report in EP10166774, Dec. 3, 2010.
Search Report in EP10181979, Nov. 17, 2010.
Search Report in EP10195564, May 20, 2011, EP.
Search Report in EP10195567, May 24, 2011.
Search Report in EP10195650, May 4, 2011.
Search Report in EP10195655, Jun. 15, 2011, EP.
Search Report in EP10196443, May 27, 2011.
Search Report in EP10196444, May 25, 2011.
Search Report in PCTEP2004006544, Jan. 28, 2005, WO.
Search Report in PCTEP2006000800, Aug. 2, 2006, WO.
Search Report in PCTEP2006000801, Aug. 11, 2006, WO.
Search Report in PCTEP2009066093, Mar. 17, 2010.
Search Report in PCTEP2009066095, Mar. 23, 2010, WO.
Search Report in PCTEP2009066098, Mar. 17, 2010.
Search Report in PCTEP2009066104, Jan. 14, 2010, WO.
Search Report in PCTEP2009066105, Jan. 28, 2010.
Search Report in PCTEP2009066107, Jan. 12, 2010, WO.
Search Report in PCTEP2011058922, Sep. 15, 2011.
Search Report in PCTEP2011065601, Oct. 21, 2011.
Search Report in PCTEP2011070933, Mar. 21, 2012, WO.
Search Report in PCTEP2011070948, Feb. 9, 2012, WO.
Search Report in PCTEP2011071150, Jan. 30, 2012.
Search Report in PCTEP2011071168, Feb. 9, 2012.
Search Report in PCTEP2011071282, Jan. 25, 2012.
Search Report in PCTEP2011071397, Feb. 9, 2012.
Shahidi et al., Margarine processing plants and equipment, Edible Oil and Fat Product, Margarine processing plants and equipment, 2005, pp. 502, 518.
Shurtleff et al., History of Soy Oil Hydrogenation and of Research on the Safety of Hydrogenated Vegetable Oils, SoyInfo Center, 2007, pp. 1-9.
Starches, Tate & Lyle Product Brochure, 2009, pp. 1-16.
Strawberry Powder Flavor GA1403, Strawberryflavor.com, 2005, pp. 1.
The American Heritage Dictionary, 1982, pp. 407, 1225, 2nd College Edition.
Turk et al., Micronization of pharmaceutical substances by the Rapid Expansion of Supercritical Solutions (RESS): a promising method to improve bioavailability of poorly soluble pharmaceutical agents, The Journal of Supercritical Fluids, Jan. 2002, pp. 75-84, vol. 22 Issue 1.

(56) References Cited

OTHER PUBLICATIONS

Van Den Enden et al., A Method for the Determination of the Solid Phase Content of Fats Using Pulse Nuclear Magnetic Resonance, Fette Seifen Anstrichmittel, 1978, pp. 180-186, vol. 80.
Van Den Enden et al., Rapid Determination of Water Droplet Size Distributions by PFG-NMR, Journal of Colloid and Interface Science, Nov. 1990, pp. 105-113, vol. 140 No. 1.
Van Den Enden, A Method for the Determin of the Solid Phase Content of Fats Using Pulse Nuclear Magnetic Resonance, Fette Seifen Anstrichmittel, 1978, 180, 5, US.
Von Bonsdorff et al, Optimizing the Crystal Size and Habit of β-Sitosterol in Suspension, AAPS PharmSciTech, 2003, pp. 1-8, 4 (3).
Written Opinion in EP03077247, Apr. 7, 2004.
Written Opinion in EP05075384, Jul. 5, 2005.
Written Opinion in EP05075393, Jul. 20, 2005.
Written Opinion in EP06122483, Jul. 15, 2008, EP.
Written opinion in EP08172283, Jun. 5, 2009.
Written Opinion in EP08172284, Jun. 4, 2009, EP.
Written Opinion in EP08172286, May 20, 2009, EP.
Written Opinion in EP08172298, Apr. 9, 2009, EP.
Written Opinion in EP08172300, Jun. 5, 2009.
Written Opinion in EP08172304, May 28, 2009.
Written Opinion in EP10166774, Dec. 3, 2010.
Written Opinion in EP10181979, Nov. 11, 2010.
Written Opinion in EP10195564, May 20, 2011, EP.
Written Opinion in EP10195567, May 24, 2011.
Written Opinion in EP10195655, Jun. 15, 2011.
Written Opinion in EP10196443, May 27, 2011.
Written Opinion in EP10196444, May 25, 2011, EP.
Written Opinion in PCTEP2004006544, Jan. 28, 2005, WO.
Written Opinion in PCTEP2006000800, Aug. 2, 2006, WO.
Written Opinion in PCTEP2006000801, Aug. 11, 2006.
Written Opinion in PCTEP2009066093, Mar. 17, 2010.
Written Opinion in PCTEP2009066095, Mar. 23, 2010, WO.
Written Opinion in PCTEP2009066098, Mar. 17, 2010.
Written Opinion in PCTEP2009066104, Jan. 14, 2010, WO.
Written Opinion in PCTEP2009066105, Jan. 28, 2010.
Written Opinion in PCTEP2009066107, Jan. 12, 2010, WO.
Written Opinion in PCTEP2011058922, Sep. 15, 2011.
Written Opinion in PCTEP2011065601, Oct. 21, 2011.
Written Opinion in PCTEP2011070933, Mar. 21, 2012, WO.
Written Opinion in PCTEP2011070948, Feb. 9, 2012, WO.
Written Opinion in PCTEP2011071150, Jan. 30, 2012.
Written Opinion in PCTEP2011071168, Feb. 9, 2012.
Written Opinion in PCTEP2011071282, Jan. 25, 2012.
Written Opinion in PCTEP2011071397, Feb. 9, 2012.

* cited by examiner

PROCESS FOR THE PREPARATION OF A SPREADABLE DISPERSION

FIELD OF THE INVENTION

The present invention relates to a process for the preparation of a spreadable edible dispersion comprising oil and structuring agent, in particular to such dispersions comprising oil and structuring agent as continuous phase and a dispersed phase. The dispersed phase may be an aqueous liquid (thus forming a water-in-oil emulsion) and/or a solid particulate matter (thus forming a suspension).

BACKGROUND OF THE INVENTION

Edible dispersions comprising oil and structuring agent are well known. Examples of well-known products that substantially consist of such edible dispersions are water-in-oil emulsions, such as for instance margarines and spreads. These edible dispersions typically have an oil phase that is a blend of liquid oil and fat that is solid at normal ambient temperature (20° C.). This solid fat, often also designated as hardstock, acts as structuring agent, and its function is to stabilise the dispersion. For a margarine or spread, ideally the structuring agent has such properties that it should have melted or dissolved at mouth temperature, otherwise the product has a heavy, waxy mouthfeel.

Other known dispersions comprising oil and structuring agent are disclosed in EP-A-775444 and WO 98/47386. Herein the dispersed phase is a dry particulate matter, such as e.g. flour, starch, salt, spices, herbs etc.

Generally, the edible dispersions comprising structuring agent are prepared according to prior art processes that encompass the following steps:
1) mixing/dispersion of the aqueous phase and/or the solid phase and the oil phase, at a temperature where the oil phase, including the structuring agent is liquid;
2) formation of a fat crystal network to stabilise the resulting dispersion and give the product some degree of firmness;
3) modification of the crystal network to produce the desired firmness and confer plasticity.

In case the dispersion is a low-fat water-in-oil emulsion spread (i.e. with a oil content of 45 wt % or less), normally in step 1) a oil-in-water emulsion (premix) is formed, which in step 2) is inverted, so that a transition of the emulsion from oil-in-water to water-in oil (inversion) occurs. Inversion has a number of disadvantages: it is difficult to control and rework (i.e. material that is not packed, but returned to the premix, needs to be reinverted, which may lead to processing complications.

The steps 1)-3) are usually conducted in a process that involves apparatus that allow heating, cooling and mechanical working of the ingredients, such as the churn process or the votator process. The churn process and the votator process are described in Ullmanns Encyclopedia, Fifth Edition, Volume A 16 pages 156-158. Using these techniques excellent dispersions (spreads) having high emulsion stability and good melting properties in the mouth can be prepared.

However, a disadvantage of the known processes is that the process involves a heating step and a cooling step and therefore requires a lot of energy. In a dispersion with for instance 4 wt. % structuring agent the whole weight of the dispersion (100 wt. %) needs to be heated and cooled.

Another disadvantage of the known processes is that the choice of fats that can practically be used as structuring agent is rather limited. If the melting point of the structuring agent is too high the melting properties in the mouth are unsatisfactory. If on the other hand, the melting point is too low, the emulsion stability will be negatively affected. Moreover the amount of saturated fatty acids in the structuring agent is usually relatively high. Saturated fatty acids are a known risk factor for cardiovascular health.

Further disadvantage of the known processes is that the product may deteriorate due to the changes in temperature caused by the heating and cooling step and that heat-sensitive ingredients cannot be incorporated.

Additionally, when low-fat spreads are prepared an inversion step is usually needed, which is difficult to control and has rework problems.

Co-pending application PCT/EP2004/006544 describes edible dispersions, including water-in-oil emulsions, that comprise a structuring agent having a microporous structure of submicron size particles. The water-in-oil emulsion may be a table spread. In the examples pourable emulsions and pourable dispersions were described. The edible dispersions may for instance be prepared by mixing an oil phase with structuring agent particles with a separately prepared water phase.

SUMMARY OF THE INVENTION

It is therefore an object of the invention to provide a process for the preparation of a spreadable dispersion that requires less energy than the known processes. Another object is to provide such a process that allows the use of more types of structuring agent, especially more sorts of hardstock. A further object of the invention is a reduction of the amount of saturated fatty acids in the hardstock. Still a further object of the invention is to provide a process for the preparation of a dispersion that allows the incorporation of heat-sensitive ingredients and/or that avoids deterioration of the emulsion.

One or more of these objects is attained according to the invention which provides a process for the preparation of a spreadable edible dispersion wherein a mixture of oil and solid structuring agent particles is subjected to stirring and an aqueous phase is gradually added to the mixture until a dispersion is obtained, wherein the solid structuring agent particles, also described as secondary particles have a microporous structure, and said particles are agglomerates of primary particles of submicron size, said primary particles are platelets having an average thickness of 0.01-0.5 µm.

Gradually is herein defined as not adding the whole solid or aqueous phase at the start of the process, but in two or more portions at different times during the process if conducted batchwise or in two or more places in the process equipment in a continuous process.

With the process according to the invention, products are obtained that have a smaller water droplet size (D3,3 as described herein) and a firmer structure (Stevens value as described herein measured at room temperature) than products prepared according to the prior art votator process. The smaller water droplet size leads to increased microbiological stability, so products may be made that need less or no salt and/or preservative.

Further according to the invention low fat spreads may be prepared that need no thickenener or gelling agent in the water phase. When low-fat spreads are prepared an additional advantage of the process according to the invention is that no inversion is needed.

Contrary to the process described in Co-pending application PCT/EP2004/006544, in the present process the aqueous phase and/or solid phase is gradually added to the mixture until a dispersion of the desired oil content is obtained. This makes the preparation of dispersion having a relatively low oil content, i.e. below 45 wt. %, possible.

DETAILED DESCRIPTION OF THE INVENTION

According to the invention, an aqueous phase is gradually added to a mixture of oil and solid structuring agent particles which is stirred, until a dispersion is obtained. A dispersion is herein defined as a system in which two or more phases that are insoluble or only slightly soluble are distributed in one another.

The dispersion may be an emulsion, a suspension or foam or any combination thereof, it may be oil continuous, water continuous or bi-continuous. Preferably the dispersion is oil continuous, more preferably an oil continuous emulsion or oil continuous suspension.

Where a solid phase is present in the dispersion according to the invention, it is preferably a solid phase of dry particulate matter.

Where an aqueous phase is present in the dispersion according to the invention, it is preferably a dispersed aqueous phase.

The amounts given will be expressed in wt. % relative to the total weight of the food composition, unless indicated otherwise.

Fat and oil may sometimes be used interchangably herein, for instance fat phase and oil phase and fat content or oil content may be used to indicate the same.

According to the invention spreadable edible dispersions are provided comprising micronised structuring agent particles wherein said structuring agent particles, also described as secondary particles have a microporous structure, and said particles are agglomerates of primary particles of submicron size, said primary particles are platelets having an average thickness of 0.01-0.5 μm, wherein the dispersion has a Stevens value, as defined herein and measured at room temperature, of 30 g or more, preferably 50 g or more, more preferably 80 g or more and most preferably 100 g or more.

Preferably the dispersion is a low-fat water-in-oil emulsion spread having a fat content of 45 wt. % or less.

The invention further provides a low-fat water-in-oil emulsion spread having a fat content of 45 wt. % or less, a Stevens value as defined herein as defined herein and measured at room temperature, of 60 g or more and a saturated fat content (SAFA) of 25 wt. % or less. SAFA content (wt. %) is herein expressed based on the weight of the fat phase.

Preferably the spreadable edible dispersions according to the invention have a low water droplet size, preferably the water droplet size as defined herein is 10 μm or less, more preferably 5 μm or less.

According to the invention, the dispersion is formed by mixing oil, the solid structuring agent particles and the other phase or phases of the dispersion, such as for example an aqueous phase, a solid phase and/or a gas phase.

According to the invention, the solid structuring agent particles (also described herein as secondary particles) should have a microporous structure of submicron size particles (also described herein as primary particles).

The secondary particles are agglomerates of primary particles which have a microporous structure. The size of the primary particles is submicron (that is have a diameter below 1μ).

An example of a microporous structure is shown in FIGS. 6 and 7 of PCT/EP2004/006544. The primary particles typically have the shape as shown in FIG. 7, in which the platelets with submicron dimensions are the primary particles. The thickness of the platelets should be submicron, preferably the thickness is on average 0.01-0.5 μm, more preferably 0.03-0.2 μm, even more preferably 0.06-0.12 μm.

Equivalent good results were obtained for a secondary particles having a microporous structure of more bubble-like shape, such as shown in FIG. 10 of PCT/EP2004/006544. In such microporous structure the wall thickness of the bubbles should be submicron, for instance on average 0.01-0.5 μm, more preferably 0.03-0.2 μm, even more preferably 0.06-0.12 μm.

The secondary particles, may, in the course of the preparation of the dispersion, for instance through the force of a mixer, be broken into submicron particles. The resulting submicron particles will form the structuring network of the dispersion.

Preferably, the structuring agent is edible lipid, more preferably it is edible fat. Edible fats consist predominantly of triglycerides. Typically such edible fats suitable as structuring agent are mixtures of triglycerides, some of which have a melting point higher than room or ambient temperature and therefore contain solids in the form of crystals.

The solid structuring agent, also denoted as hardstock, serves to structure the fat phase and helps to stabilise the dispersion.

For imparting to common margarine a semi-solid, plastic, spreadable consistency this stabilising and structuring functionality plays an important role. The crystals of the solid fat form a network throughout the liquid oil resulting into a structured fat phase. The aqueous phase droplets are fixed within the spaces of the lattice of solid fat crystals. In this way coalescence of the droplets and separation of the heavier aqueous phase from the fat phase is prevented.

Figure 1:
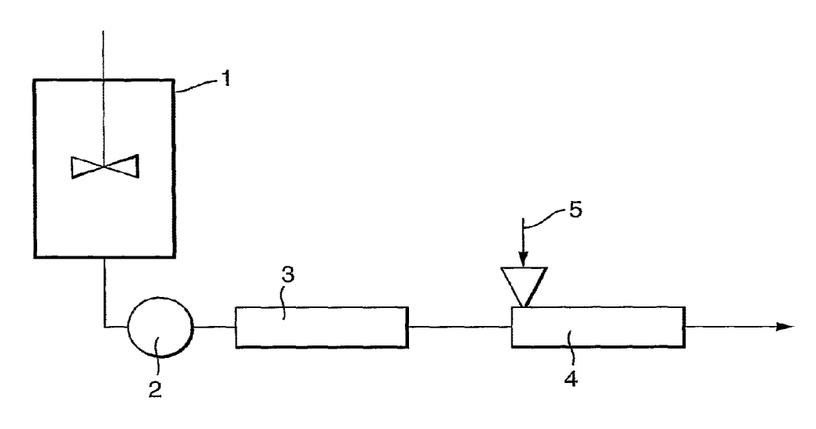
FIG. 1 Process flow diagramme for a continuous process. (1) designates a premix vessel, (2) a pump, (3) a high shear mixer, (4) an extruder type mixer and (5) a feed entrance for micronised fat.

The process according to the invention may be executed batch-wise or continuous. Conventional unit operations and apparatus, e.g. mixers, pumps and extruders may be used. A suitable process flow diagram for a continuous process according to the invention is given in FIG. 1. Micronised fat may be added to the premix or via the inlet (5), preferably at least part of the micronised fat is added via inlet (5).

Further common ingredients of the fat phase are emulsifiers, such as monoglycerides and lecithin, colouring agents and flavours.

The solid structuring agent particles (secondary particles) preferably have an average particle size ($D_{3,2}$) of 60 micrometer or less, more preferably the solid structuring agent particles have an average particle size of 30 micrometer or less. The average particle size ($D_{3,2}$) is determined as indicated in the examples.

Preferably the solid structuring agent particles are prepared using a micronisation process. In the micronisation process the solid structuring agent particles are prepared by preparing a homogeneous mixture of structuring agent and liquified gas or supercritical gas at a pressure of 5-40 MPa and expanding the mixture through an orifice, under such conditions that a spray jet is applied in which the structuring agent is solidified and micronised. The liquified gas or supercritical gas may be any gas that may be used in the preparation of food products, for example carbondioxide, nitrogen, propane, ethane, xenon or other noble gases. Carbondioxide and propane are preferred. Carbondioxide is most preferred. Advantages of carbondioxide are that it has a mild (31° C.) critical temperature, it is non-flammable, nontoxic, environmentally friendly and it may be obtained from existing industrial processes without further contribution to the greenhouse effect. It is fairly miscible with oil and is readily recovered owing to its high volatility at ambient conditions. Finally liquid $CO_2$ is the second least expensive solvent after water.

The temperature of the mixture of structuring agent and liquified gas or supercritical gas is preferably such that the mixture forms a homogeneous mixture. Advantageously, the temperature of the mixture of structuring agent and liquified gas or supercritical gas is below the slip melting point of the structuring agent at atmospheric pressure and above the temperature at which phase separation of the mixture occurs. Under such conditions the smallest micronised particles may be obtained.

The pressure and temperature of the mixture of structuring agent and liquified or supercritical gas is preferably such that a large amount of the gas may be dissolved in the structuring agent. The amount dissolved will be determined by the phase diagram of the mixture of structuring agent and liquified or supercritical gas. At higher pressures as well as at lower temperatures more gas will dissolve in the structuring agent.

Preferably the temperature and pressure are chosen such that 10 wt. % or more, more preferably 20 wt. % or more or most preferably 30 wt. % or more of gas is dissolved in the liquid phase. The mixture of structuring agent and liquified or supercritical gas may contain additional substances, such as for instance oil. We have found that the addition of oil may reduce sintering of the micronised particles of the structuring agent.

The mixture containing structuring agent and liquified or supercritical gas is depressurised over a small orifice or nozzle, to break up the mixture into small droplets. The break-up of the mixture into droplets can be assisted e.g. by internals inside the nozzle before the orifice to generate a whirl, or by passing a gas at a high flow rate near the orifice.

The mixture is depressurised into a volume where the pressure is higher than, equal to or lower than atmospheric pressure.

We have found that sintering, agglomeration and ripening of micronised particles of the structuring agent will lead to a reduced performance of the particles for structuring the dispersion.

To avoid sintering, agglomeration and/or ripening of the micronised particles, preferably a gas jet is applied in addition to the flow of the spray jet. The additional gas jet is most effective when the gas jet is positioned such that recirculation of material expanded through the orifice is reduced or avoided. Especially advantageous is a position wherein the gas from the gas jet flows essentially tangentially to the flow direction of the spray jet. Most advantageously the gas inlet for the gas jet is positioned behind the exit of the nozzle, see FIG. 2 of co-pending application PCT/EP2004/006544. This figure shows that the additional gas inlet (1) behind the exit of the nozzle (2) creates a gas flow (3) tangentially to the flow of the spray jet (4).

A further preferred edible dispersion according to the invention is a dispersion of a solid matter, preferably a dry particulate matter, dispersed in a continuous phase of oil and structuring agent. Preferred material for the dry particulate matter is one or more of flour, starch, salt, herbs (e.g. dried herbs), spices and mixtures thereof. Preferably in such dispersions, the amount of solid matter is 30-75 wt. %, more preferably 40-65 wt. % based on total weight of the dispersion.

The amount of structuring agent should be such that a suitably stable dispersion is obtained. When the structuring agent is micronised fat, the amount is preferably 1-20 wt. %, more preferably 4-12 wt. % based on total weight of the dispersion.

EXAMPLES

General

Method to Determine Slip Melting Point

The slip melting point of structuring agent is determined in accordance with F. Gunstone et al, The Lipid Handbook, second edition, Chapman and Hall, 1995, page 321, Point 6.2.3, Slip point.

Method to Determine $D_{3,2}$ of the Particle Size Distribution of Micronised Fat Particles Low-angle laser light scattering (LALLS, Helos Sympatic) was used to measure the average particle size ($D_{3,2}$). The fat particles were suspended in water in a quixel flow cuvette with an obscuration factor of 10-20%. The diffraction pattern was measured at 632.8 nm with a lens focus of 100 mm and a measurement range of 0.5-175 Calculations were bases on the Fraunhofer theory.

A full description of the principle of LALLS is given in ISO 13320-1.

Method to Determine $D_{3,3}$ of Water Droplet Size Distribution in an Emulsion

The water droplet size was measured using a well-known low resolution NMR measurement method. Reference is made to Van den Enden, J. C., Waddington, D., Van Aalst, H., Van Kralingen, C. G., and Packer, K. J., Journal of Colloid and Interface Science 140 (1990) p. 105.

Method to Determine Oil Exudation

Oil exudation is determined by measuring the height of the free oil layer that appears on top of the product. This free oil layer is considered a product defect. In order to measure oil exudation, the product is filled into a scaled glass cylinder of 50 ml. The filling height is 185 mm. The filled cylinder is stored in a cabinet at constant temperature (15° C.). Height measurements are executed every week, by measuring the height of the exuded oil layer in mm with a ruler. Oil exudation is expressed as the height of the exuded oil layer divided by the original filling height and expressed in %. Shaking of the cylinders should be avoided.

Stevens Value

Stevens values give an indication about the firmness of a product. The firmness of all products stored at 5° C. for 24 hours was measured at room temperature using a Stevens Texture Analyser (1 mm/sec, 25 mm depth, 4.4. mm probe) and is quoted herein as the Stevens value (in g).

Example 1

Preparation of a Spreadable Margarine

A high-fat spreadable margarine was prepared with the composition shown in table 1:

TABLE 1

Composition of high-fat spreadable margarine

| Ingredient | Amount (wt. %) |
|---|---|
| Oil phase | |
| Sunflower oil | 59.68 |
| Micronised fat powder[1] | 9.64 |
| Lecithin Bolec ZT[1] | 0.32 |
| Emulsifier Hymono 8903 | 0.20 |
| beta-carotene (0.4 wt. % solution in sunflower oil) | 0.15 |
| Water phase | |
| Water | 29.65 |
| Potassium sorbate | 0.08 |
| Sodium chloride | 0.28 |

[1]Hardstock fat as prepared in example 1 and 2 of EP-A-89082 which was micronised as in example 1 of PCT/EP2004/006544.

The water phase was prepared by adding salt and potassium sorbate to distilled water and adjusting the pH of distilled water from 7.7 to 4.0 using 5 wt. % solution of citric acid in water, and heated for 5 minutes in a bath of 60° C. to dissolve the solids. The oil phase was prepared by dissolving the emulsifier ingredients and β-carotene in the total amount of sunflower oil at 60° C. and cooled down to 15° C. afterwards. Subsequently the micronised fat powder was added to the oil phase carefully using a spatula and the oil phase was mixed with a kitchen mixer (Philips Essence HR1357/05) for 2 minutes. Then the water phase was added to the oil phase and the resulting mixture was mixed with the mixer for another 5 minutes at ambient temperature. A droplet size (D3,3) of about 10 μm was obtained. The spread was put in a margarine tub and stored at 5° C. Results in table 3.

Example 2

Preparation of a Low-Fat Spread

A low-fat (33 wt. % fat) spreadable margarine spread was prepared with the composition shown in table 2:

TABLE 2

Composition of low-fat spread

| Ingredient | Amount (wt. %) |
|---|---|
| Oil phase | |
| Sunflower oil | 27.65 |
| Micronised fat powder as in example 1 | 4.59 |
| Lecithin Bolec ZT[1] | 0.32 |
| Emulsifier Hymono 8903 (monoglyceride) | 0.33 |
| Beta-carotene (0.4 wt. % solution in sunflower oil) | 0.15 |
| Water phase | |
| Water | 66.60 |
| Potassium sorbate | 0.08 |
| Sodium chloride | 0.28 |

The micronised fat powder was mixed with half of the oil to obtain a fat powder/oil slurry. The fat/oil slurry was then stirred manually in the remainder of the oil to make the oil phase. In the next step the oil phase (slurry) was put in an EscoLabor device and half of the water phase was added to the oil phase. The EscoLabor vessel was kept at 5° C. The water and oil phase were mixed under vacuum.

The scraper speed was found to be 80% of the maximum rotational speed and power of the Ultra Turrax was found to be optimal at 50% of maximum power. During the mixing of the oil- and water phases the remaining amount of water was added cautiously within 5 minutes. This yielded a homogeneous but very thick fat continuous product after 15 minutes. After 15 a droplet size (D3,3) of 3 μm was obtained. This low fat spread was evaluated after 4 weeks of storage at 5° C. Results are given in table 3.

TABLE 3

Stevens values and fat level low-fat micronised fat spread

| Example | Fat level (%) | Stevens value at 5° C. (g) |
|---|---|---|
| Example 1 | 70 | 88 |
| Example 2 | 33 | 112 |

Example 3

A spread was produced with a composition as in table 4. A stable spread resulted. The water phase was made by mixing the salt in distilled water and holding the mixture at room temperature. The fat phase was produced by adding the micronised fat powder to liquid oil using a spatula. The water phase and the oil phase were mixed using a home kitchen mixer.

It was possible to prepare a stable spread without emulsifier and thickener. The long term stability and/or consistency of the spread without emulsifier may be improved by adding a thickener to the water phase, e.g. 1 wt. % starch, a suitable starch type is Resistamyl 310.

TABLE 4 composition of example 3

| | | |
|---|---|---|
| Oil Phase | Sunflower oil | 39.85 |
| | Micronised fat powder as in example 1 | 33.87 |
| | | 5.98 |
| | Beta-carotene (0.4 wt. % solution in Sunflower oil) | 0.15 |
| Water phase | Water | 59.5 |
| | Salt | 0.5 |
| | | 100 |

The invention claimed is:

1. A process for the preparation of a spreadable edible dispersion comprising subjecting a mixture of oil and solid structuring agent particles, which structuring agent particles comprise mixtures of triglycerides, to stirring and gradually adding an aqueous phase to the mixture until a dispersion is obtained, the dispersion comprising oil and structuring agent as continuous phase, said dispersion comprising an emulsion, wherein the solid structuring agent particles, also described as secondary particles have a microporous structure, and said particles are agglomerates of primary particles of submicron size, said primary particles are platelets having an average thickness of 0.01-0.5 μm.

2. The process according to claim 1, wherein the solid structuring agent particles are edible lipid.

3. The process according to claim 1, wherein the lipid is a fat.

4. The process according to claim 1, wherein the solid structuring agent particles were prepared using a process wherein the solid structuring agent particles were prepared by preparing a homogeneous mixture of structuring agent and liquefied gas or supercritical gas at a pressure of 5-40 MPa and expanding the mixture through an orifice, in which the structuring agent was solidified.

5. Spreadable edible dispersion obtainable by a process according to claim 1.

6. A process for the preparation of a spreadable edible dispersion comprising subjecting a mixture of oil and solid structuring agent particles of edible lipid, which structuring agent particles are mixtures of triglycerides, to stirring and gradually adding an aqueous phase to the mixture until a dispersion is obtained, the dispersion comprising oil and structuring agent as continuous phase, said dispersion being an emulsion or a suspension, or any combination thereof, wherein the solid structuring agent particles, also described as secondary particles have a microporous structure, and said particles are agglomerates of primary particles of submicron size, said primary particles are platelets having an average thickness of 0.01-0.5 µm wherein the solid structuring agent particles were prepared using a process wherein the solid structuring agent particles were prepared by preparing a homogeneous mixture of structuring agent and liquefied gas or supercritical gas at a pressure of 5-40 MPa and expanding the mixture through an orifice, in which the structuring agent was solidified.

7. The process according to claim 6, wherein the solid structuring agent particles comprise edible lipid.

8. The process according to claim 7, wherein the lipid comprises a fat.

9. Spreadable edible dispersion obtainable by a process according to claim 6.

10. The process according to claim 1 wherein the dispersion has a Stevens value measured at room temperature of 30 g or more.

11. The process according to claim 1 wherein the spreadable edible dispersion has a fat phase and a saturated fat content of 25 wt % or less expressed on the weight of the fat phase.

12. The process according to claim 1 wherein the secondary particles in the course of preparation of the dispersion are broken into submicron particles.

13. The process according to claim 6 wherein the liquefied or supercritical gas is carbon dioxide, nitrogen, propane, ethane or a noble gas.

14. The process according to claim 1 wherein the dispersion comprises 1-20 wt % structuring agent based on the total weight of the dispersion.

15. The process according to claim 6 wherein the dispersion has a Stevens value measured at room temperature of 30 g or more.

16. The process according to claim 6 wherein the spreadable edible dispersion has a fat phase and a saturated fat content of 25 wt % or less expressed on the weight of the fat phase.

17. The process according to claim 6 wherein the secondary particles in the course of preparation of the dispersion are broken into submicron particles.

18. The process according to claim 6 wherein the dispersion comprises 1-20 wt % structuring agent based on the total weight of the dispersion.

19. The process according to claim 1 wherein the structuring agent comprise edible fats which are mixtures of triglycerides some of which have a melting point higher than room temperature.

20. The process according to claim 6 wherein the structuring agent comprise edible fats which are mixtures of triglycerides some of which have a melting point higher than room temperature.

* * * * *